May 4, 1926. 1,583,520
J. C. BOLT
METHOD AND APPARATUS FOR VULCANIZING INNER TUBES OR THE LIKE
Filed Jan. 5, 1925
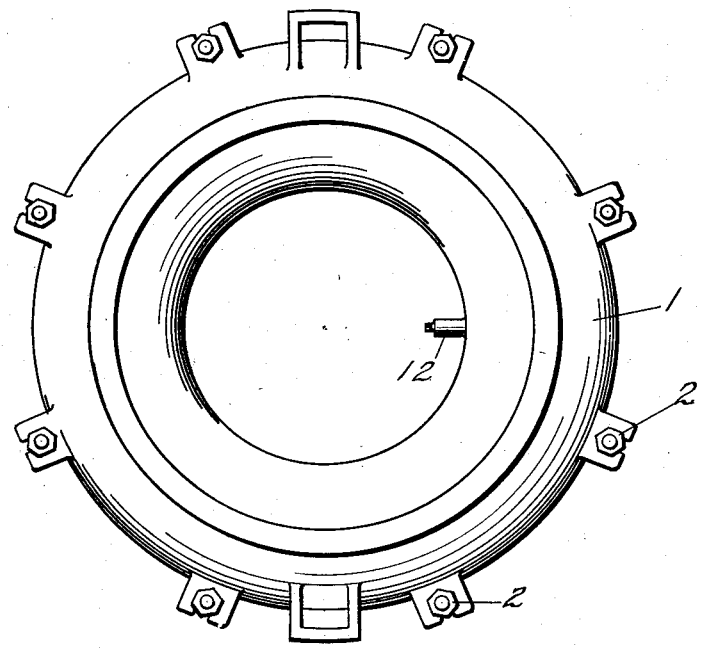
FIG-1
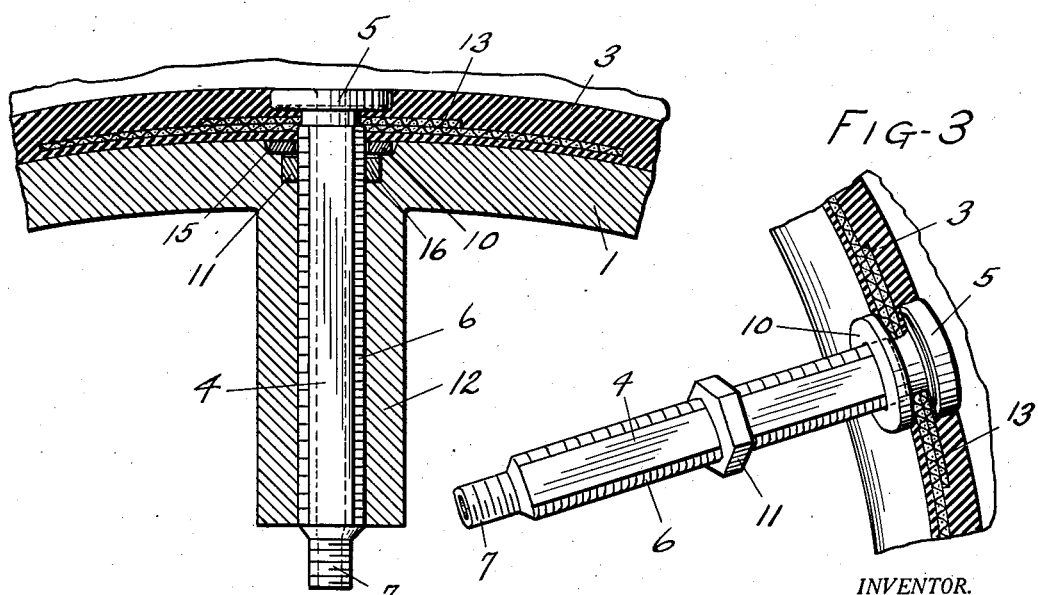
FIG-2  FIG-3
INVENTOR.
JOSEPH C. BOLT
BY 
ATTORNEY.

Patented May 4, 1926.

1,583,520

UNITED STATES PATENT OFFICE.

JOSEPH CLARENCE BOLT, OF BOUNDBROOK, NEW JERSEY.

METHOD AND APPARATUS FOR VULCANIZING INNER TUBES OR THE LIKE.

Application filed January 5, 1925. Serial No. 494.

*To all whom it may concern:*

Be it known that I, JOSEPH CLARENCE BOLT, a citizen of the United States, and a resident of Boundbrook, county of Somerset, State of New Jersey, have invented certain new and useful Improvements in Methods and Apparatus for Vulcanizing Inner Tubes or the like, of which the following is a specification.

This invention relates to the vulcanization of inner tubes such as used in pneumatic tires for vehicles, and is directed to certain steps in the method of curing or vulcanizing such tubes, whereby certain advantages are obtained over prior practices. The invention also relates to the apparatus used in the process.

More specifically described, the invention relates to the vulcanization of inner tubes by molding, as distinguished from the usual process of wrapping the tubes and curing them upon poles or mandrels within fabric casings or wrappers, or upon poles or mandrels without wrapping. By the molding process the tubes are cured within circular molds and by the process many advantages are obtained. The tubes are molded within heated jackets or mold sections and are subjected to the internal pressure of any suitable fluid, such as steam or steam and air in combination or various inert gases and fluids.

The present invention has for its direct object the provision of a process and apparatus by which the valve stem is molded in the inner tube, whereby an air tight connection is simply, cheaply and effectively obtained between the valve and the tube without the use of added reinforcements other than the usual valve patch. Attempts have been made to mold the air valve directly within the tube, but, so far as known to me, no one has succeeded in accomplishing this result effectively, due largely to the fact that the pressure within the tube during vulcanization, at which time the rubber is soft, has forced the valve through the wall of the tube to such an extent that the tube will leak about the valve stem either immediately or such leaks will develop with later use of the tube.

By the use of my process and apparatus, however, I am enabled to overcome this difficulty and have, in addition, utilized the pressure within the tube to secure a proper embedding of the valve within the wall of the tube and thereby prevent leakage in the finished product.

The process and apparatus are fully disclosed in the specification and drawing herein, it being understood, however, that the showing is of one embodiment of the invention only, and changes and modifications may be made within the scope of the invention and the claims forming a part hereof.

In the drawings:

Figure 1 is a view of a tube vulcanizing mold of any preferred type;

Figure 2 is an enlarged sectional view of the mold at the valve stem; and

Figure 3 is a perspective view of the air valve cured within the tube, the tube being cut away to show the construction.

The mold is indicated by the numeral 1. As stated above, it may be of any preferred type suitable for the vulcanization of an inner tube. For this purpose it may be made in two halves provided with any suitable means 2 by which the halves may be secured together during the curing of the tube. In order to heat the tube to perform the vulcanization of the rubber, the walls of the mold may be chambered for the reception of steam, or the mold may be placed between hot plates. Any other means may be employed, all of which will be understood by those skilled in the art.

The rubber tube, a portion of which is shown in the drawing is indicated by the numeral 3 and the valve stem by the numeral 4. The valve stem is of the usual construction, being provided with an enlarged base 5 and a screw-threaded stem 6, the outer end of the stem being reduced to form a nipple 7 to which, in the process of vulcanization, a source of pressure may be attached for the introduction of a fluid or fluids under pressure, it being understood that fluids may be used for the purpose of expanding the tube into the cavity of the mold or used for curing the tube.

On the valve stem is mounted in service the ring washer 10 and the nut 11, the former being loosely received over the valve stem and the latter being screwed upon the threaded portion of the valve stem. On the inner circumference of the mold sections are provided extensions 12 which are provided with radial recesses in which the valve stem is received.

In the wall of the tube at the valve are usually embedded one or two layers of fabric 13 which reenforce the tube about the valve stem.

In the manufacture of tubes by vulcanization within molds under pressure, one of the chief drawbacks to the full commercial success of the process has been the fact that the pressure within the tube during vulcanization has caused the valves to be forced into the tube wall to such an extent that the pressure fluid has either leaked out altogether or the base of the valve has been brought into contact with the layers of fabric, which have subsequently afforded passageways for the escape of the pressure. Heretofore, another drawback has been that the short channel usually provided for the valve stem in the mold has oftentimes resulted in the operative incorrectly positioning the valve and the tube in the mold. Also in prior processes the weight of the ring washer and the fact that it loosely fits on the valve stem has oftentimes resulted in its sagging on the stem. Accordingly it frequently encounters the edge of the recess provided for it and is thus held out of its proper place resulting in misplacement thereof in the finished tube.

By my process I propose to utilize both the pressure within the tube and the softening of the rubber to obtain a more secure fastening of the valve stem within the tube, and also to insure an accurate positioning of the tube, the valve stem and the ring washer.

The correct positioning of the tube and the valve stem is obtained by the provision of the extension 12 which supports the valve stem during the curing operation. At the inner end of the channel between the two mold halves which receive the valve stem, there are provided two recesses or enlargements to receive the ring washer 10 and the nut 11, respectively. The first recess is indicated by the numeral 15 and is preferably of the same depth as the thickness of the ring washer. The wall of this recess is slightly tapered so that the ring washer will readily seat and will be guided into position. This eliminates any danger of the loose ring washer becoming jammed due to its tendency to tilt or get out of position.

The nut is received within the second recess 16, immediately below the recess 15 the nut being run down upon the valve stem to a light but firm fit against ring washer 10 before the tube is placed within the mold. The recess 16 is slightly greater in depth than the thickness of the nut, the amount being variable as found desirable. I have found that a depth approximately $\frac{1}{32}$ of an inch greater than the thickness of the nut is sufficient to accomplish the results desired, although this amount is not obligatory and may be altered.

In vulcanizing the valve stem to the tube it is usually embedded to approximately the depth of the valve base. By providing the recess 16 of slightly greater depth than the nut, the pressure within the tube will force the valve base into the soft rubber of the tube to the extent permitted by the recess 16 and no further, so that a firm embedding of the valve in the rubber is obtained, but not sufficiently to cause leakage either immediately or later. The depth of recess 16 as compared with the thickness of nut 11 must be such that valve base 5 is prevented from coming in contact with fabric patch 13.

As a result of the process described and by the use of the apparatus superior results are obtained in the curing of tubes under pressure. Sufficient movement of the valve is permitted to obtain a secure seating of the valve but the movement is arrested before the valve base comes in contact with the fabric patches 13.

Having explained the invention in detail, it will be understood that the principles thereof may be secured in other ways and by the use of other apparatus within the scope of the invention as set forth in the claims. While the process has been described for the curing of tubes it may be applicable to other and analogous purposes.

What is claimed is:

1. The process of vulcanizing rubber tubes under internal pressure with the valve stem in position, comprising the step of permitting the valve stem to move outwardly as a result of the internal pressure while the rubber is softened during vulcanization, and arresting the movement of the valve stem after the base thereof has become embedded within the rubber.

2. In the process of vulcanizing rubber tubes under internal pressure, the step of inserting the valve stem within the tube, accurately positioning the valve stem, applying heat and pressure within the tube to cure it and permitting the base of the valve stem to become partially embedded within the tube wall by the pressure within the tube.

3. An apparatus for curing inner tubes under pressure, comprising a mold for the tube having a channel to receive the valve stem, a recess communicating with the channel to receive the nut upon the valve stem, said recess having a shoulder at such position as to arrest the outward movement of the valve stem when the base has become partially embedded within the wall of the tube.

JOSEPH C. BOLT.